US009143216B1

(12) United States Patent
Loc

(10) Patent No.: US 9,143,216 B1
(45) Date of Patent: *Sep. 22, 2015

(54) APPARATUS AND METHOD FOR TRANSITIONING A CIRCUIT FOR DETERMINING A CONDITION OF A CHANNEL FROM AN INACTIVE STATE TO AN ACTIVE STATE BASED ON A RECEIVED REQUEST

(71) Applicant: Marvell International LTD., Hamilton (BM)

(72) Inventor: Peter Loc, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,644

(22) Filed: Dec. 23, 2013

Related U.S. Application Data

(63) Continuation of application No. 13/279,697, filed on Oct. 24, 2011, now Pat. No. 8,619,656, which is a continuation of application No. 12/154,031, filed on May 20, 2008, now Pat. No. 8,045,535, which is a (Continued)

(51) Int. Cl.
*H04Q 7/10* (2006.01)
*H04B 7/06* (2006.01)

(52) U.S. Cl.
CPC .................................. *H04B 7/0632* (2013.01)

(58) Field of Classification Search
CPC . H04W 52/02; H04W 52/0229; H04W 88/02; H04W 52/028; H04W 24/00
USPC ............... 455/412.1, 414, 567, 574; 370/338, 370/430, 431, 465
See application file for complete search history.

(56) References Cited

U.S. PATENT DOCUMENTS 6,574,453 B1  6/2003  Honda et al.
7,340,615 B2  3/2008  Krantz et al.
7,359,311 B1  4/2008  Paranjpe et al.

(Continued)

OTHER PUBLICATIONS

IEEE 802.11a; Supplement to IEEE Standard for Information Technology—Telecommunications and information exchange between systems—Local and Metropolitan Area Networks—Specific Requirements—Part 11: Wireless LAN Medium Access Control (MAC) and Physical Layer (PHY) specifications; High-Speed Physical Layer in the 5.GHz Band; 1999; 91 pages.

(Continued)

*Primary Examiner* — Ajit Patel
*Assistant Examiner* — Julio Perez

(57) ABSTRACT

A first network device including a transceiver, a circuit and a controller. The transceiver receives a first packet broadcast from a second network device to multiple network devices via a channel. A bit in the first packet indicates a request for a condition of the channel. The network devices include the first network device. The circuit determines the condition of the channel based on the bit in the first packet. The controller, prior to the circuit determining the condition of the channel and in response to the bit in the first packet, transitions the circuit to an active state. The controller, subsequent to the circuit determining the condition of the channel, returns the circuit to an inactive state. The transceiver, subsequent to the circuit returning to the inactive state, transmits a second packet to the second network device. The second packet indicates the condition of the channel.

20 Claims, 6 Drawing Sheets

Related U.S. Application Data continuation of application No. 11/068,441, filed on Feb. 28, 2005, now Pat. No. 7,385,959.

(60) Provisional application No. 60/652,423, filed on Feb. 11, 2005.

(56) References Cited

U.S. PATENT DOCUMENTS

| 2004/0001429 | A1 | 1/2004 | Ma et al. |
| 2004/0203472 | A1 | 10/2004 | Chien |
| 2005/0135318 | A1 | 6/2005 | Walton et al. |
| 2006/0008020 | A1 | 1/2006 | Blankenship et al. |
| 2006/0120395 | A1 | 6/2006 | Xing et al. |

OTHER PUBLICATIONS

IEEE P802.11g; Draft Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band; Apr. 2003; 69 pages.

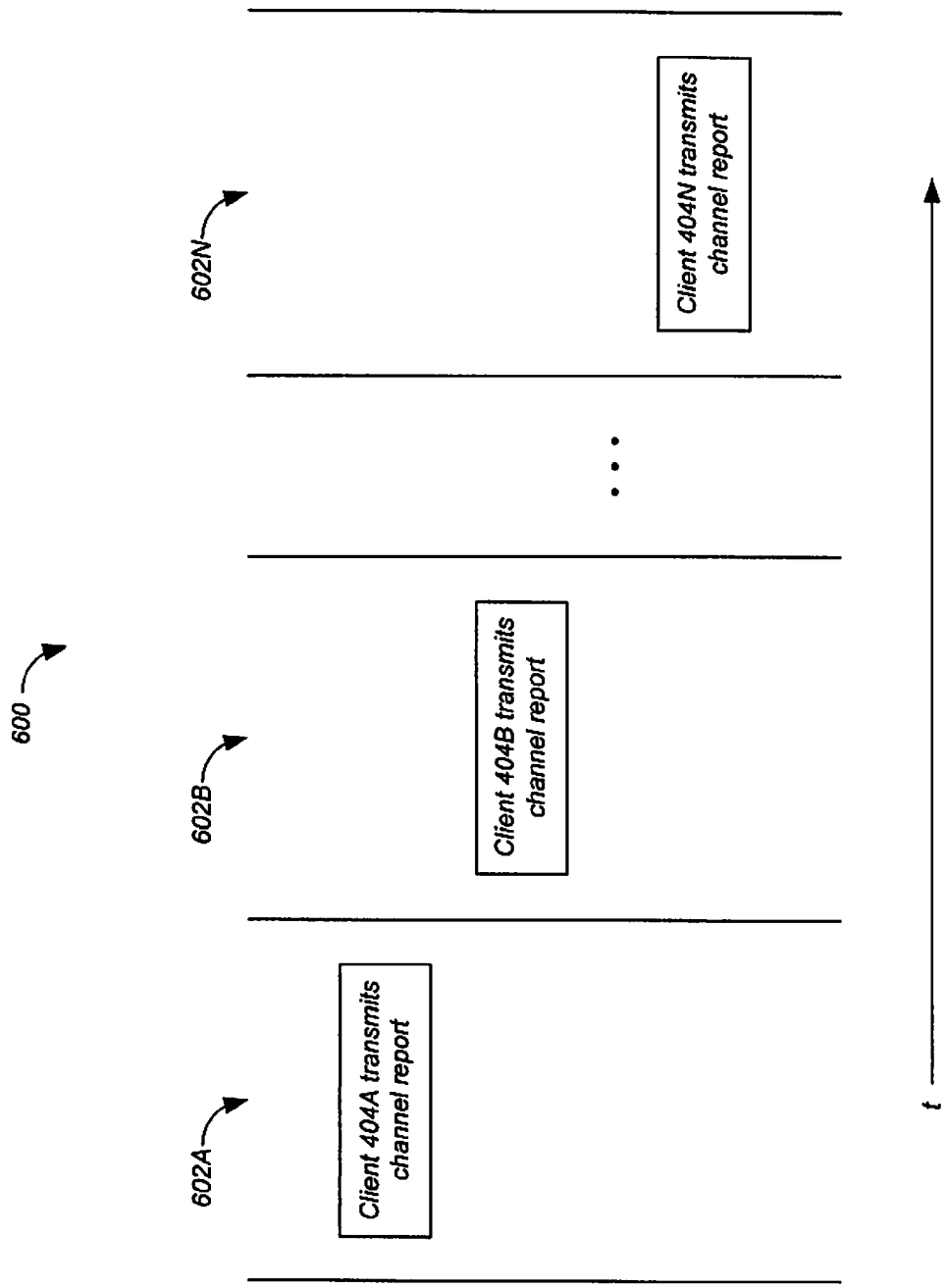

APPARATUS AND METHOD FOR TRANSITIONING A CIRCUIT FOR DETERMINING A CONDITION OF A CHANNEL FROM AN INACTIVE STATE TO AN ACTIVE STATE BASED ON A RECEIVED REQUEST

CROSS-REFERENCE TO RELATED APPLICATIONS

This application is a continuation of U.S. patent application Ser. No. 13/279,697 (now U.S. Pat. No. 8,619,656), filed Oct. 24, 2011, which is a continuation of U.S. patent application Ser. No. 12/154,031 (now U.S. Pat. No. 8,045,535) filed on May 20, 2008, which is a continuation of U.S. patent application Ser. No. 11/068,441 (now U.S. Pat. No. 7,385,959), filed Feb. 28, 2005, which claims the benefit of U.S. Provisional Application No. 60/652,423, filed on Feb. 11, 2005. The entire disclosures of the applications referenced above are incorporated herein by reference.

FIELD

The present disclosure relates generally to wireless data communications. More particularly, the present disclosure relates to providing feedback describing the condition of an Orthogonal Frequency Division Modulation (OFDM) channel.

BACKGROUND

Conventional OFDM-based Multiple Input, Multiple Output (MIMO) wireless data communication systems employ a feedback mechanism that provides information describing the condition of the OFDM channel so that transmitters on the channel can maximize the bandwidth of the channel. Each packet transmitted over the channel includes a preamble, a signal field, and a payload. Receivers use the preamble to synchronize with the transmitter, perform channel estimation, and adjust gain settings. The signal field specifies the data rate of the data packet that follows, the number of antennas used, and additional information to assist the receiver in decoding the data packet.

Each receiver on the channel measures the channel while receiving the preamble of each packet. The signal field includes a channel condition request bit that, when set, requests a channel condition report from the receiver. When the receiver receives a packet with the channel condition request bit set, the receiver transmits a channel condition report based on the most recent channel condition measurement taken by the receiver.

The receiver does not know in advance when it will receive a channel condition request. And by the time the receiver processes the signal field in a packet to determine whether the channel condition request bit in the signal field is set, the preamble portion of the packet has already passed through the receiver, and so cannot be measured. Therefore this scheme requires that the measurement circuit that measures the channel condition be constantly active (that is, powered). Therefore the measurement circuit constantly consumes power, which constitutes a significant battery drain for a mobile receiver.

SUMMARY

A network device is provided and includes a first transceiver configured to wirelessly receive a first packet from a second transceiver via a channel. The second transceiver is in a wireless device separate from the network device. A circuit is configured to determine a condition of the channel based on the first packet. The circuit has an inactive state and an active state. Elements of the circuit are powered while the circuit is in the active state. The elements of the circuit are not powered while the circuit is in the inactive state. A controller is configured to transition the circuit from the inactive state to the active state in response to the first transceiver wirelessly receiving the first packet, and return the circuit to the inactive state responsive to the circuit having completed determining the condition of the channel.

In other features, a method is provided and includes receiving a first packet via a first transceiver. The first packet is transmitted from a second transceiver to the first transceiver via a channel. A condition of the channel is determined based on the first packet via a circuit. The circuit has an inactive state and an active state. Elements of the circuit are powered while the circuit is in the active state. The elements of the circuit are not powered while the circuit is in the inactive state. The circuit is transitioned from the inactive state to the active state in response to the first packet being received via the first transceiver. The circuit is returned to the inactive state in response to completing the determining of the condition of the channel.

In other features, a wireless data communications device is provided and includes: a Multiple Input, Multiple Output (MIMO) transceiver to communicate on an Orthogonal Frequency Division Modulation (OFDM) channel; and a measurement circuit having an active state and an inactive state. The measurement circuit measures a channel condition of the OFDM channel in the active state. A controller places the measurement circuit in the active state after a request for the channel condition is received on the OFDM channel, and places the measurement circuit in the inactive state after the measurement circuit measures the channel condition of the OFDM channel and until a further request for the channel condition is received on the OFDM channel.

In other features, the MIMO transceiver includes: a MIMO receiver to receive a signal on the OFDM channel. The signal includes a first packet including a first preamble and a first signal field including a channel condition request, and a second packet following the first packet. The second packet includes a second preamble. The measurement circuit measures the channel condition of the OFDM channel during reception of the second preamble. In other features, the MIMO transceiver includes: a MIMO transmitter to transmit a packet on the OFDM channel. The packet represents the channel condition of the OFDM channel measured by the measurement circuit. In other features, the packet includes channel coefficients representing the channel condition of the OFDM channel. In other features, the channel coefficients include an amplitude gain and frequency offset for each point in a Quadrature Amplitude Modulation (QAM) constellation representing the OFDM channel. In other features, the MIMO transmitter transmits the packet according to a predetermined schedule. In other features, the wireless data communications device is compliant with IEEE standard 802.11n.

In other features, a method for a Multiple Input, Multiple Output (MIMO) wireless data communications device communicating on an Orthogonal Frequency Division Modulation (OFDM) channel is provided. The method includes: receiving, on the OFDM channel, a request for the channel condition of the OFDM channel; and placing a measurement circuit of the wireless communications device in an active state after the request for the channel condition is received. The measurement circuit measures the channel condition of the OFDM channel in the active state; and places the measurement circuit in an inactive state after the measurement circuit measures the channel condition of the OFDM channel and until a further request for the channel condition of the OFDM channel is received on the OFDM channel.

In other features, the receiving of the request for the channel condition of the OFDM channel includes: receiving a signal on the OFDM channel. The signal includes a packet including a preamble and a signal field including a channel condition request. Some other features further include receiving a second packet following the packet, the second packet including a second preamble. The measurement circuit measures the channel condition of the OFDM channel during reception of the second preamble. Some other features further include transmitting a packet on the OFDM channel, the packet representing the channel condition of the OFDM channel measured by the measurement circuit. In some other features, the packet includes channel coefficients representing the channel condition of the OFDM channel. In some other features, the channel coefficients include an amplitude gain and frequency offset for each point in a Quadrature Amplitude Modulation (QAM) constellation representing the OFDM channel. In some other features, the packet is transmitted according to a predetermined schedule. In some other features, the wireless data communications device is compliant with IEEE standard 802.11n.

In other features, a wireless data communications device is provided and includes: Multiple Input, Multiple Output (MIMO) transceiver means for communicating on an Orthogonal Frequency Division Modulation (OFDM) channel; and means for measuring having an active state and an inactive state. The means for measuring measures a channel condition of the OFDM channel in the active state. The wireless data communications device further includes controller means for placing the means for measuring in the active state after a request for the channel condition is received on the OFDM channel, and for placing the means for measuring in the inactive state after the means for measuring measures the channel condition of the OFDM channel and until a further request for the channel condition is received on the OFDM channel.

In some other features, the MIMO transceiver means includes MIMO receiver means for receiving a signal on the OFDM channel. The signal includes a first packet including a first preamble and a first signal field including a channel condition request, and a second packet following the first packet. The second packet includes a second preamble. The means for measuring measures the channel condition of the OFDM channel during reception of the second preamble. In some other features, the MIMO transceiver means includes MIMO transmitter means for transmitting a packet on the OFDM channel. The packet represents the channel condition of the OFDM channel measured by the means for measuring. In some other features, the packet includes channel coefficients representing the channel condition of the OFDM channel. In some other features, the channel coefficients include an amplitude gain and frequency offset for each point in a Quadrature Amplitude Modulation (QAM) constellation representing the OFDM channel. In some other features, the MIMO transmitter means transmits the packet according to a predetermined schedule. In some other features, the wireless data communications device is compliant with IEEE standard 802.11n.

In other features a computer program for a Multiple Input, Multiple Output (MIMO) wireless data communications device communicating on an Orthogonal Frequency Division Modulation (OFDM) channel is provided. The computer program includes instructions for placing a measurement circuit of the wireless communications device in an active state after a request for a channel condition of the OFDM channel is received on the OFDM channel. The measurement circuit measures the channel condition of the OFDM channel in the active state; and places the measurement circuit in an inactive state after the measurement circuit measures the channel condition of the OFDM channel and until a further request for the channel condition of the OFDM channel is received on the OFDM channel.

In some other features, the request for the channel condition of the OFDM channel includes receiving a packet including a preamble and a signal field including a channel condition request. In some other features, the measurement circuit measures the channel condition of the OFDM channel during reception of a preamble of a second packet received after the packet. Some features further include causing the MIMO wireless data communications device to transmit a packet on the OFDM channel, the packet representing the channel condition of the OFDM channel measured by the measurement circuit. In some other features, the packet includes channel coefficients representing the channel condition of the OFDM channel. In some other features, the channel coefficients include an amplitude gain and frequency offset for each point in a Quadrature Amplitude Modulation (QAM) constellation representing the OFDM channel. In some other features, the packet is transmitted according to a predetermined schedule. In some other features, the wireless data communications device is compliant with IEEE standard 802.11n.

The details of one or more implementations are set forth in the accompanying drawings and the description below. Other features will be apparent from the description and drawings, and from the claims.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 6 shows an example schedule for transmission of the channel report packets.

Figure 1:
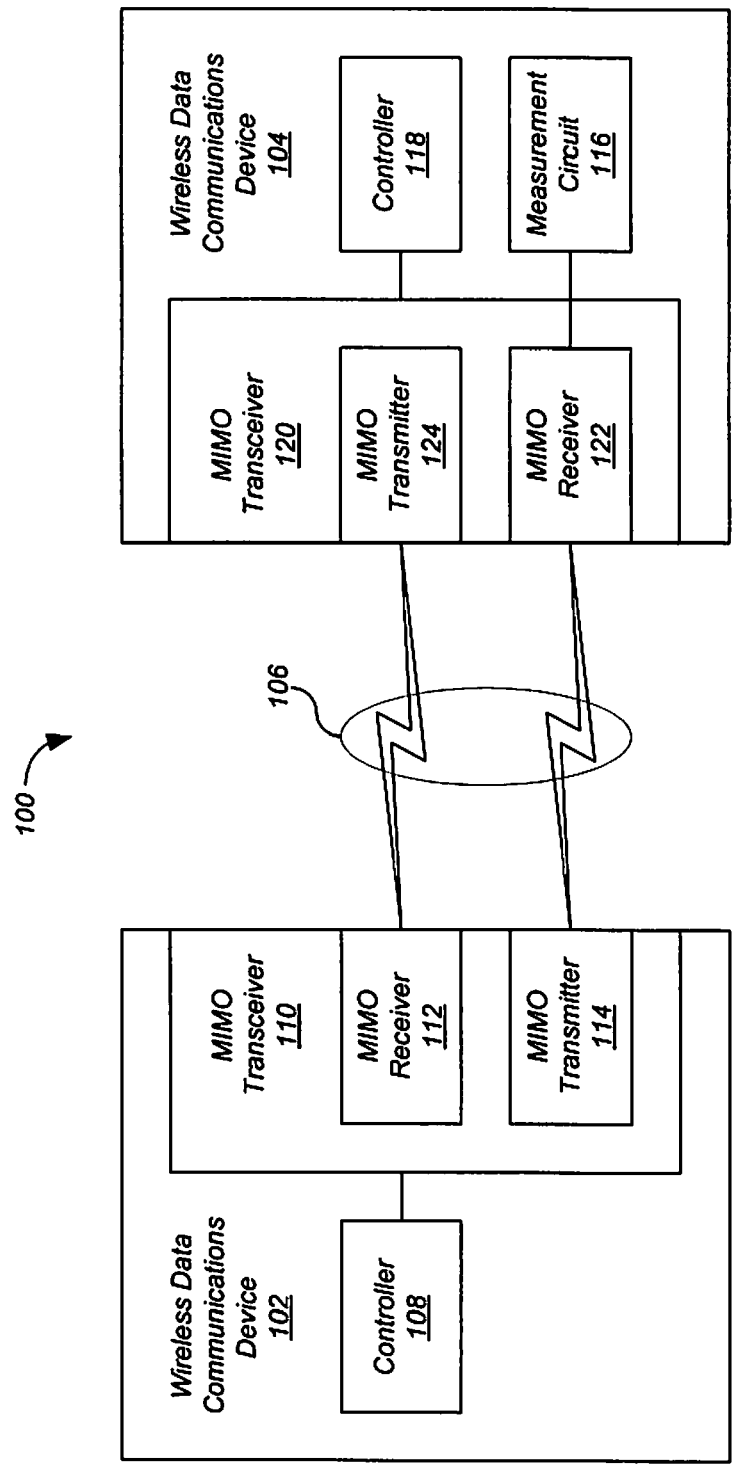
FIG. 1 shows an OFDM MIMO wireless data communications system including two wireless data communications devices communicating over a OFDM channel according to the present disclosure.

The leading digit(s) of each reference numeral used in this specification indicates the number of the drawing in which the reference numeral first appears.

DESCRIPTION

Techniques of the present disclosure provide OFDM channel condition feedback mechanisms that significantly reduce power consumption compared to conventional mechanisms. In particular, receivers according to these techniques measure the OFDM channel condition only when requested by a transmitter on the channel. Therefore the measurement circuits in these receivers can be inactivated (that is, powered down) when channel measurements are not required, thereby achieving significant power savings compared to conventional receivers that measure the channel condition for each packet received, and therefore must power their measurement circuits continuously. While these mechanisms are especially useful in an N×M MIMO OFDM channel where the number of transmit antennas N>1 and/or the number of receive antennas M>1, they are also applicable to the case where N=M=1.

FIG. 1 shows a OFDM MIMO wireless data communications system 100 including two wireless data communications devices 102 and 104 communicating over a OFDM channel 106 that can be a direct wireless link between devices 102 and 104 or a wireless network such as a wireless local-area network (WLAN) that can operate in ad-hoc mode, infrastructure mode, or any other network mode. Wireless data communications devices 102 and 104 are compliant with IEEE standard 802.11n in techniques where the number of transmit antennas N>1 and/or the number of receive antennas M>1, and with IEEE standards 802.11a and 802.11g where N=M=1.

Wireless data communications device 102 includes a controller 108 and a MIMO transceiver 110 that includes a MIMO receiver 112 and a MIMO transmitter 114. Of course, controller 108 can be implemented as part of MIMO transceiver 110 rather than separately.

Wireless data communications device 104 includes a controller 118 and a MIMO transceiver 120 that includes a MIMO receiver 122 and a MIMO transmitter 124. Wireless data communications device 104 also includes a measurement circuit 116 to measure a channel condition of OFDM channel 106. Of course, controller 118 and/or measurement circuit 116 can be implemented as part of MIMO transceiver 120 rather than separately.

Measurement circuit 116 has an active state (that is, a state in which the active elements of measurement circuit 116 are powered) and an inactive state (that is, a state in which the some or all of the active elements of measurement circuit 116 are not powered). Measurement circuit 116 measures a channel condition of OFDM channel 106 in the active state according to well-known techniques. Measurement circuit 116 changes between active and inactive states under the control of controller 118.

Figure 2:
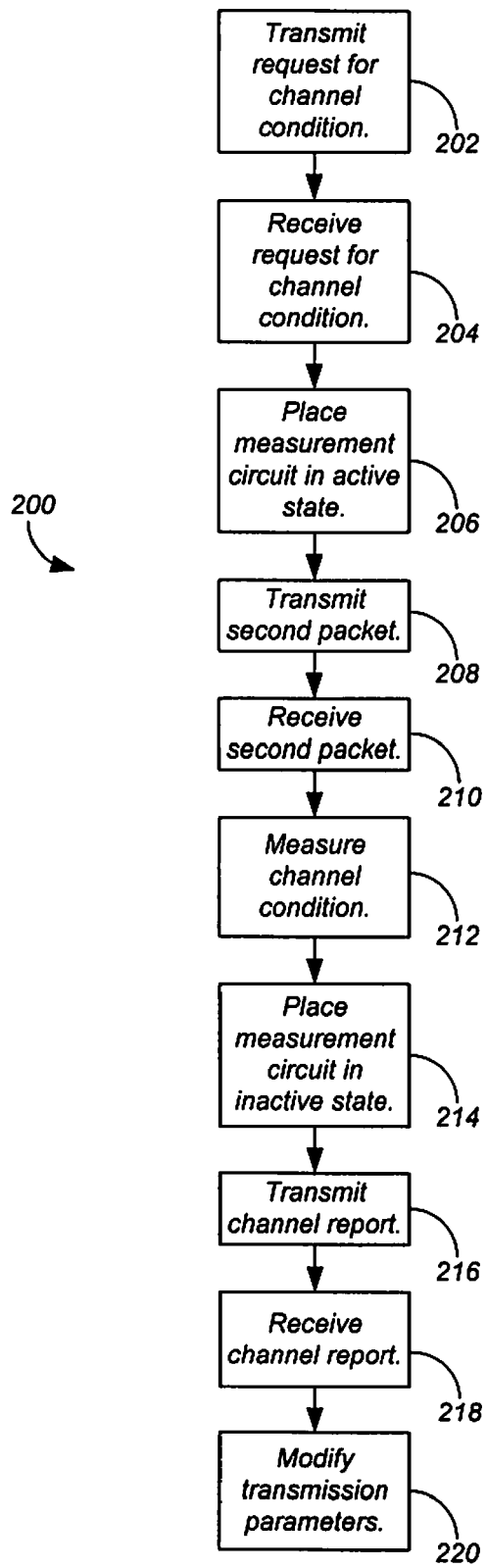
FIG. 2 shows a process for the wireless data communications system of FIG. 1 according to the present disclosure.

FIG. 2 shows a process 200 for wireless data communications system 100 of FIG. 1. Controller 108 of wireless data communications device 102 causes MIMO transmitter 114 to transmit a packet that includes a request for a channel condition of OFDM channel 106 (step 202).

Figure 3:
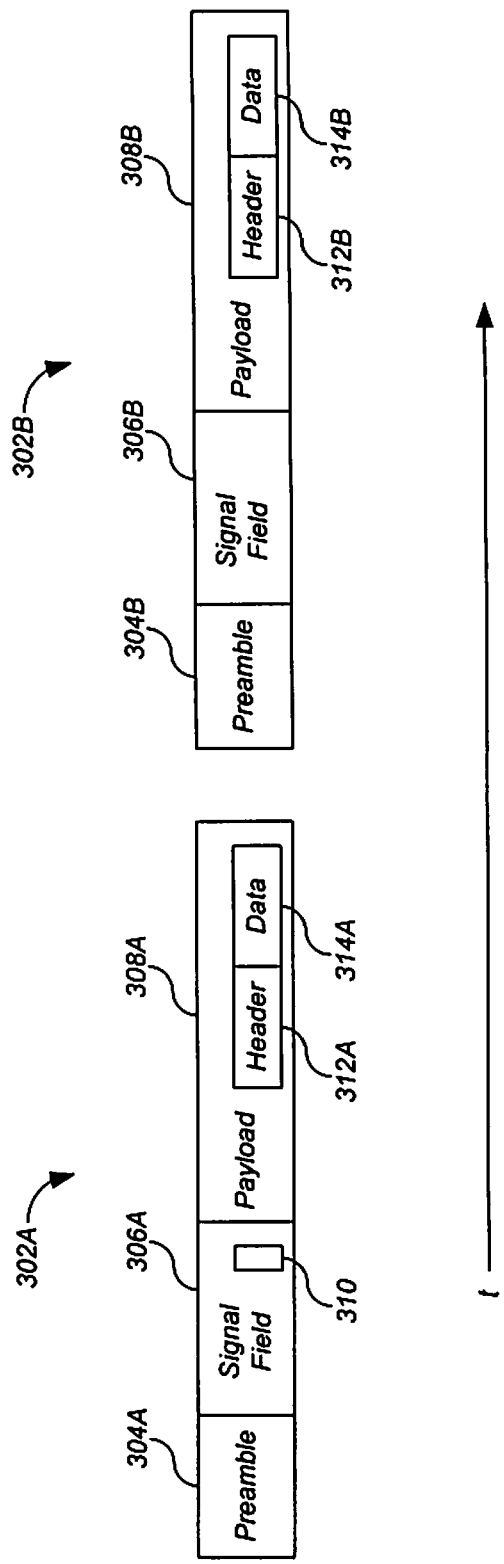
FIG. 3 shows a signal transmitted by the MIMO transmitter of FIG. 1 with respect to time t according to the present disclosure.

FIG. 3 shows a signal 300 transmitted by MIMO transmitter 114 with respect to time t. Each packet 302 transmitted by transmitter 114 includes a preamble 304 followed first by a signal field 306, and then by a payload 308. The payload 308 may include a header 312 and a data field 314. Signal field 306 includes a channel condition request bit 310 that, when set, indicates a request for the channel condition of the OFDM channel. When channel condition request bit 310 is set, the length of data field 314 may be set to zero. However, in some implementations data field 314 is populated. When the channel condition request is directed to one or more specific wireless data communication devices 104, header 312 in payload 308 includes the addresses of those devices 104. Otherwise header 312 can be omitted as well.

Receiver 122 of wireless data communications device 104 receives the packet including the channel condition request (step 204), which is shown as packet 302A in FIG. 3. Controller 118 places measurement circuit 116 in the active state after the request for the channel condition is received (step 206).

Transmitter 114 of wireless data communications device 102 transmits a second packet (step 208), which is shown as packet 302B in FIG. 3. Receiver 122 of wireless data communications device 104 receives packet 302B (step 210). Measurement circuit 116 measures the channel condition of OFDM channel 106 during reception of preamble 304B of packet 302B (step 212). After measurement circuit 116 measures the channel condition of OFDM channel 106, controller 118 places measurement circuit 116 in the inactive state (step 214), thereby conserving power when no measurement is needed.

MIMO transmitter 124 of wireless data communications device 104 then transmits a channel report packet on OFDM channel 106 that represents the channel condition of OFDM channel 106 as measured by measurement circuit 116 (step 216). The channel report packet may include channel coefficients representing the channel condition of OFDM channel 106. The channel coefficients represent an amplitude gain and frequency offset for each point in a Quadrature Amplitude Modulation (QAM) constellation representing OFDM channel 106.

The coefficients are complex numbers that are a function of the number Nc of subcarriers, the number Nt of antennas at the transmitter, and the number Nr of antennas at the receiver. Each complex coefficient is typically represented by 4 bytes of binary data. For IEEE 802.11a, Nc=52 requiring 52×4=208 bytes. For an IEEE 802.11n MIMO system with Nc=52 and Nt=Nr=2, the coefficients require 52×2×2×4=832 bytes.

Wireless data communications device 102 receives the channel condition report (step 218). Controller 108 modifies the transmission parameters of MIMO transmitter 114 in accordance with the channel coefficients in the channel condition report (step 220).

Figure 4:
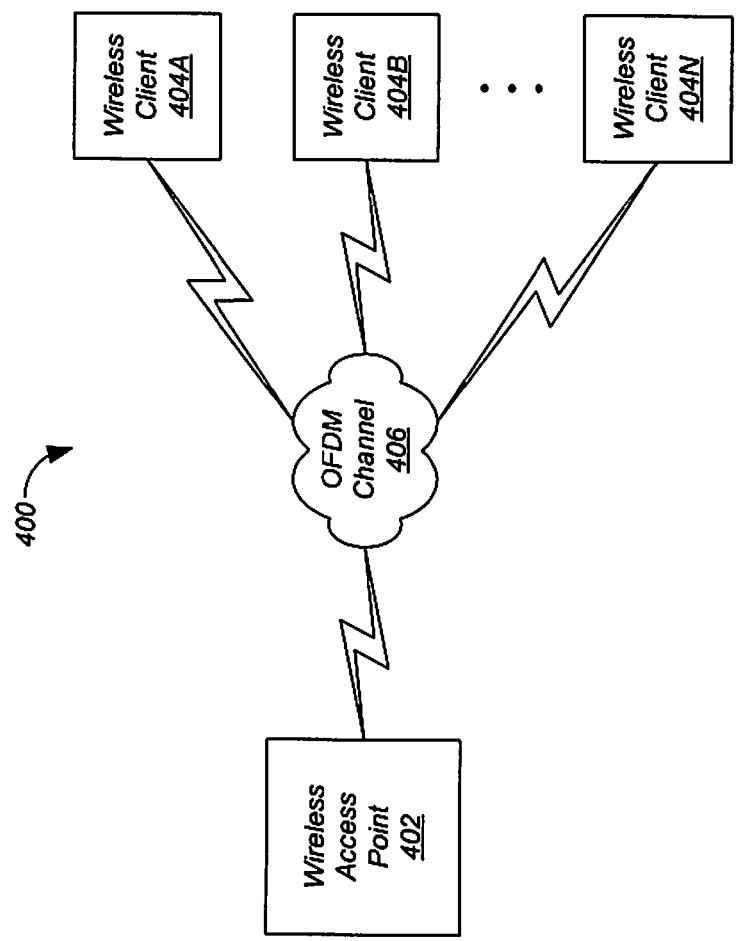
FIG. 4 shows a WLAN including a wireless access point communicating with wireless clients over an OFDM channel according to the present disclosure.

In some techniques, a single wireless communications device, such as an access point, collects channel condition measurements from a plurality of other wireless communications devices, such as wireless clients in an IEEE 802.11 infrastructure-mode WLAN. FIG. 4 shows a WLAN 400 including a wireless access point 402 communicating with wireless clients 404A, 404B, through 404N over an OFDM channel 406.

Figure 5:
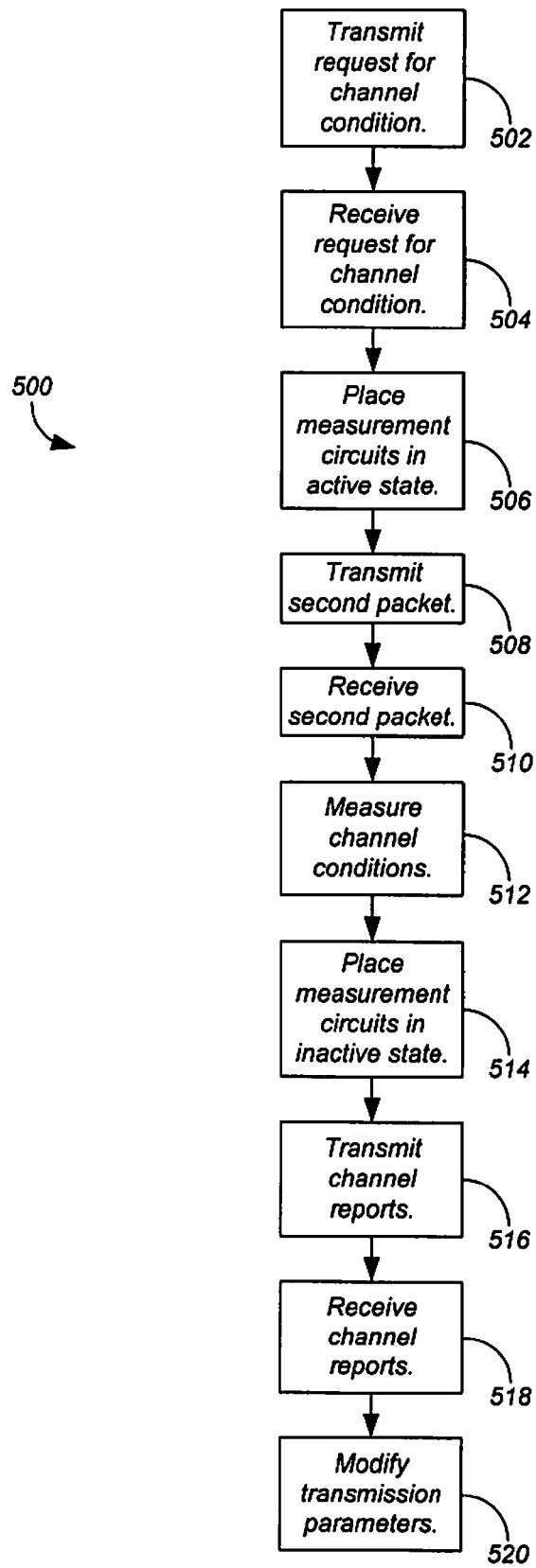
FIG. 5 shows a process for the WLAN of FIG. 4 according to the present disclosure.

FIG. 5 shows a process 500 for WLAN 400 of FIG. 4. Wireless access point 402 transmits a packet 302A including a channel condition request (step 502). Packet 302 can be a broadcast packet or a multicast packet including the addresses of wireless clients 404A, 404B, through 404N.

Wireless clients 404 receive the packet (step 504), and place their measurement circuits 116 in the active state (step 506). Wireless access point 402 then transmits a second packet 302B (step 508). The measurement circuits 116 in wireless clients 404 receive the packet (step 510) and measure the condition of OFDM channel 406 during reception of the preamble 304B of packet 302B (step 512).

After measurement circuits 116 measure the channel condition of OFDM channel 406, wireless clients 404 place measurement circuits 116 in the inactive state (step 514), thereby conserving power when no measurement is needed.

Each wireless client 404 then transmits a channel report packet on OFDM channel 406 that represents the channel condition of OFDM channel 406 as measured by the measurement circuit 116 in that wireless client 404 (step 516).

The wireless clients 404 may transmit the channel report packets according to a predetermined schedule that is communicated by wireless access point 402 to wireless clients 404 before the measurements take place. In other techniques, the wireless clients 404 transmit the channel report packets according to conventional channel access methods.

FIG. 6 shows an example schedule 600 for transmission of the channel report packets. Wireless client 404A transmits its channel report packet during a first predetermined time slot 602A. Wireless client 404B transmits its channel report packet during a second predetermined time slot 602B, and so on. Finally, wireless client 404N transmits its channel report packet during a final predetermined time slot 602N. Of course, other scheduling techniques can be used.

Wireless access point 402 receives the channel condition reports (step 518). Controller 108 in wireless access point 402 modifies the transmission parameters of MIMO transmitter 114 in wireless access point 402 in accordance with the channel coefficients in the channel condition reports (step 520).

Aspects of the present disclosure can be implemented in digital electronic circuitry, or in computer hardware, firmware, software, or in combinations of them. Apparatus of the present disclosure can be implemented in a computer program product tangibly embodied in a machine-readable storage device for execution by a programmable processor; and method tasks of the present disclosure can be performed by a programmable processor executing a program of instructions to perform functions disclosed herein by operating on input data and generating output.

The techniques disclosed herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A first network device comprising:
a transceiver configured to receive a first packet broadcast from a second network device to a plurality of network devices via a channel, wherein a bit in the first packet indicates a request for a condition of the channel, and wherein the plurality of network devices include the first network device;
a circuit configured to determine the condition of the channel based on the bit in the first packet indicating the request for the condition of the channel; and
a controller configured to, prior to the circuit determining the condition of the channel and in response to the bit in the first packet indicating the request for the condition of the channel, transition the circuit from an inactive state to an active state,
wherein
the controller is configured to, subsequent to the circuit determining the condition of the channel, return the circuit to the inactive state,
the transceiver is configured to, subsequent to the circuit returning to the inactive state, transmit a second packet to the second network device, and
the second packet indicates the condition of the channel.

2. The first network device of claim 1, wherein the controller is configured to, in response to the circuit having completed the determining of the condition of the channel, return the circuit to the inactive state.

3. The first network device of claim 1, wherein:
the transceiver is configured to receive a third packet from the second network device; and
the circuit is configured to determine the condition of the channel (i) while processing the third packet, or (ii) while receiving a preamble of the third packet.

4. The first network device of claim 1, wherein the second packet comprises a plurality of channel coefficients representing the condition of the channel.

5. The first network device of claim 4, wherein the channel coefficients represent a gain and a frequency offset for each of a plurality of points in a quadrature amplitude modulation constellation representing the channel.

6. The first network device of claim 5, wherein the channel coefficients are complex numbers and are a function of (i) a number of subcarriers, (ii) a number of antennas at the transceiver, and (iii) a number of antennas at a transmitter of the second network device.

7. The first network device of claim 1, wherein:
the first packet includes (i) a first preamble, (ii) a signal field, and (iii) a payload;
the signal field includes the bit indicating the request for the condition of the channel; and
the payload does not include a data field or a header.

8. The first network device of claim 7, wherein:
the transceiver is configured to receive a third packet from the second network device;
the third packet includes a second preamble; and
the circuit is configured to determine the condition of the channel (i) based on the second preamble of the second packet, and (ii) not based on the first preamble of the first packet.

9. The first network device of claim 1, wherein:
the circuit is configured to determine the condition of the channel based on (i) a gain, and (ii) a frequency offset; and
the gain and the frequency offset are associated with a point in a constellation representing the channel.

10. The first network device of claim 1, wherein:
the transceiver is configured to, prior to the circuit determining the condition of the channel, receive a packet schedule from the second network device;
the packet schedule indicates when to report the condition of the channel to the second network device; and the controller is configured to transmit the second packet, via the transceiver, to the second network device based on the packet schedule.

11. A method comprising:
receiving a first packet at a transceiver of a first network device, wherein the first packet is broadcast from a second network device to a plurality of network devices via a channel, wherein a bit in the first packet indicates a request for a condition of the channel;
determining the condition of the channel, via a circuit, based on the bit in the first packet indicating the request for the condition of the channel;
prior to the determining of the condition of the channel and in response to the bit in the first packet indicating the request for the condition of the channel, transitioning the circuit from an inactive state to an active state;
subsequent to the determining of the condition of the channel, returning the circuit to the inactive state; and
subsequent to the circuit returning to the inactive state, transmitting a second packet to the second network device, wherein the second packet indicates the condition of the channel.

12. The method of claim 11, wherein the returning of the circuit to the inactive state is performed in response to the circuit having completed the determining of the condition of the channel.

13. The method of claim 11, further comprising receiving a third packet from the second network device,
the condition of the channel is determined (i) while processing the third packet, or (ii) while receiving a preamble of the third packet.

14. The method of claim 11, wherein the second packet comprises a plurality of channel coefficients representing the condition of the channel.

15. The method of claim 14, wherein the channel coefficients represent a gain and a frequency offset for each of a plurality of points in a quadrature amplitude modulation constellation representing the channel.

16. The method of claim 15, wherein the channel coefficients are complex numbers and are a function of (i) a number of subcarriers, (ii) a number of antennas at the transceiver, and (iii) a number of antennas at a transmitter of the second network device.

17. The method of claim 11, wherein:
the first packet includes (i) a first preamble, (ii) a signal field, and (iii) a payload;
the signal field includes the bit indicating the request for the condition of the channel; and
the payload does not include a data field or a header.

18. The method of claim 17, further comprising receiving a third packet from the second network device, wherein:
the third packet includes a second preamble; and
the condition of the channel is determined (i) based on the second preamble of the second packet, and (ii) not based on the first preamble of the first packet.

19. The method of claim 11, wherein:
the condition of the channel is determined based on (i) a gain, and (ii) a frequency offset; and
the gain and the frequency offset are associated with a point in a constellation representing the channel.

20. The method of claim 11, further comprising:
prior to the determining of the condition of the channel, receiving a packet schedule at the first network device from the second network device, wherein the packet schedule indicates when to report the condition of the channel to the second network device; and
transmitting the second packet, via the transceiver, to the second network device based on the packet schedule.

* * * * *